US011218331B2

(12) United States Patent
Pandharipande et al.

(10) Patent No.: US 11,218,331 B2
(45) Date of Patent: Jan. 4, 2022

(54) DETECTING RECOMMISSIONING

(71) Applicant: SIGNIFY HOLDING B.V., Eindhoven (NL)

(72) Inventors: Ashish Vijay Pandharipande, Eindhoven (NL); Emmanuel David Lucas Michael Frimout, Nuenen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 55 days.

(21) Appl. No.: 16/490,731

(22) PCT Filed: Feb. 26, 2018

(86) PCT No.: PCT/EP2018/054650
§ 371 (c)(1),
(2) Date: Sep. 3, 2019

(87) PCT Pub. No.: WO2018/158185
PCT Pub. Date: Sep. 7, 2018

(65) Prior Publication Data
US 2020/0021454 A1 Jan. 16, 2020

(30) Foreign Application Priority Data
Mar. 3, 2017 (EP) ..................... 17159026

(51) Int. Cl.
*H04L 12/28* (2006.01)
*H05B 47/19* (2020.01)
*H04W 24/08* (2009.01)

(52) U.S. Cl.
CPC ...... *H04L 12/2807* (2013.01); *H04L 12/2803* (2013.01); *H04W 24/08* (2013.01); *H05B 47/19* (2020.01)

(58) Field of Classification Search
CPC . H04L 12/2807; H04L 12/2803; H05B 47/19; H05B 47/175
See application file for complete search history.

(56) References Cited

U.S. PATENT DOCUMENTS 8,159,156 B2 * 4/2012 Henig .................. H05B 47/18
315/363
9,313,855 B1 * 4/2016 Sivertsen ............... H05B 45/46
(Continued)

FOREIGN PATENT DOCUMENTS

EP 3128817 A1 2/2017
WO 201650707 A1 4/2016
(Continued)

*Primary Examiner* — Michael A Keller
*Assistant Examiner* — Jsing Forng Lin

(57) ABSTRACT

Method of detecting a change in a lighting system comprising a plurality of devices each comprising a luminaire and/or a sensor, wherein each respective one of the devices has a respective location recorded in a commissioning database in association with data reported by the respective device; the method comprising: identifying a subset of said devices located within a predetermined spatial demarcation; automatically monitoring a respective value of a characteristic of each of the devices in said subset, thereby forming a data cluster comprising the values of said characteristic for the subset; automatically detecting that one of one of the devices in the subset has been moved by detecting a shift in one of the cluster values relative to the rest of the values in the data cluster; and in response to said detection, automatically outputting an indication that the commissioning database is likely to require updating to reflect said change.

19 Claims, 7 Drawing Sheets

(56) References Cited

U.S. PATENT DOCUMENTS

| | | | | |
|---|---|---|---|---|
| 2009/0066473 | A1* | 3/2009 | Simons | G01S 5/14 340/3.1 |
| 2010/0214948 | A1* | 8/2010 | Knibbe | H04W 4/029 370/254 |
| 2010/0231363 | A1* | 9/2010 | Knibbe | H04L 12/2803 340/286.02 |
| 2013/0293877 | A1* | 11/2013 | Ramer | H05B 47/18 356/213 |
| 2015/0373815 | A1* | 12/2015 | Patton | F21V 14/08 315/297 |
| 2016/0088714 | A1* | 3/2016 | Vangeel | H05B 47/115 315/297 |
| 2016/0095189 | A1 | 3/2016 | Vangeel et al. | |
| 2016/0323393 | A1* | 11/2016 | Umphreys | H04L 67/22 |
| 2017/0104532 | A1* | 4/2017 | Stout | H04W 64/006 |

FOREIGN PATENT DOCUMENTS

| | | | |
|---|---|---|---|
| WO | 2017076715 | A1 | 5/2017 |
| WO | 2018019582 | A1 | 2/2018 |

\* cited by examiner

2a

| | 202 | 204 | 206 | 208 | 210 | 212 | 214 |
|---|---|---|---|---|---|---|---|
| | T | L - ID | E (Wh) | D% | OS - ID | O | L |
| 216 → | t1 | Lum_1 | 25 | 100 | OS_1 | 1 | [Bldg1;Floor4;(x1,y1)] |
| | t1 | Lum_2 | 22 | 90 | OS_2 | 1 | [Bldg1;Floor4;(x2,y2)] |
| | t1 | Lum_3 | 10 | 40 | OS_3 | 1 | [Bldg1;Floor4;(x3,y3)] |
| | t1 | Lum_4 | 1 | 0 | OS_4 | 1 | [Bldg1;Floor4;(x4,y4)] |
| | t1 | Lum_5 | 1 | 0 | OS_5 | 0 | [Bldg1;Floor4;(x5,y5)] |

2b

| | T | L - ID | E (Wh) | D% | OS - ID | O | L |
|---|---|---|---|---|---|---|---|
| 218 → | t2 | Lum_1 | 20 | 80 | OS_1 | 1 | [Bldg1;Floor4;(x1,y1)] |
| | t2 | Lum_2 | 22 | 90 | OS_2 | 1 | [Bldg1;Floor4;(x2,y2)] |
| | t2 | Lum_3 | 10 | 40 | OS_3 | 1 | [Bldg1;Floor4;(x3,y3)] |
| | t2 | Lum_4 | 1 | 0 | OS_4 | 1 | [Bldg1;Floor4;(x4,y4)] |
| | t2 | Lum_5 | 1 | 0 | OS_5 | 0 | [Bldg1;Floor4;(x5,y5)] |

2c

| T | L - ID | E (Wh) | D% | OS - ID | O | L |
|---|---|---|---|---|---|---|
| t3 | Lum_1 | 20 | 80 | OS_1 | 1 | [Bldg1;Floor4;(x1,y1)] |
| t3 | Lum_2 | 10 | 40 | OS_2 | 0 | [Bldg1;Floor4;(x2,y2)] |
| t3 | Lum_3 | 10 | 40 | OS_3 | 1 | [Bldg1;Floor4;(x3,y3)] |
| t3 | Lum_4 | 1 | 0 | OS_4 | 1 | [Bldg1;Floor4;(x4,y4)] |
| t3 | Lum_5 | 1 | 0 | OS_5 | 0 | [Bldg1;Floor4;(x5,y5)] |

220

2d

| T | L - ID | E (Wh) | D% | OS - ID | O | L |
|---|---|---|---|---|---|---|
| tN | Lum_1 | 1 | 0 | OS_1 | 0 | [Bldg1;Floor4;(x1,y1)] |
| tN | Lum_2 | 22 | 90 | OS_2 | 1 | [Bldg1;Floor4;(x2,y2)] |
| tN | Lum_3 | 10 | 40 | OS_3 | 1 | [Bldg1;Floor4;(x3,y3)] |
| tN | Lum_4 | 25 | 100 | OS_4 | 1 | [Bldg1;Floor4;(x4,y4)] |
| tN | Lum_5 | 25 | 100 | OS_5 | 1 | [Bldg1;Floor4;(x5,y5)] |

*FIG. 2*

DETECTING RECOMMISSIONING

CROSS-REFERENCE TO PRIOR APPLICATIONS

This application is the U.S. National Phase application under 35 U.S.C. § 371 of International Application No. PCT/EP2018/054650, filed on Feb. 26, 2018, which claims the benefit of European Patent Application No. 17159026.8, filed on Mar. 3, 2017. These applications are hereby incorporated by reference herein.

TECHNICAL FIELD

The present disclosure relates to a method for detecting recommissioning in a connected lighting system.

BACKGROUND

Connected lighting refers to a system of one or more luminaires which are controlled not by (or not only by) a traditional wired, electrical on-off or dimmer circuit, but rather by using a data communications protocol via a wired or more often wireless connection, e.g. a wired or wireless network. Typically, the luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol). The lighting control device may take the form of a user terminal, e.g. a portable user terminal such as a smartphone, tablet, laptop or smart watch; or a static user terminal such as a desktop computer or wireless wall-panel. In such cases the lighting control commands may originate from an application running on the user terminal, either based on user inputs provided to the application by the user through a user interface of the user terminal (e.g. a touch screen or point-and-click interface), and/or based on an automated function of the application. The user equipment may send the lighting control commands to the luminaires directly, or via an intermediate device such as a wireless router, access point or lighting bridge.

Smart lighting systems with multiple luminaires and sensors are witnessing a steady growth. Such systems use sensor inputs, e.g. in the form of occupancy and ambient luminance measurements, to control the light output of the luminaires and adapt artificial lighting conditions to prevalent environmental conditions. Increasingly, data from sensors in such smart lighting systems is being stored in the Cloud or some backend database. Thus sensor and luminaire control data (e.g. occupancy, light sensor, energy consumption values) over large periods of time becomes available at an analytics engine. This offers the possibility to provide new data enabled analytics and services, e.g. around energy management and space utilization.

A method of commissioning a lighting system was considered in U.S. Pat. No. 8,159,156 which includes causing a light source to emit a signal, detecting the signal at light sensors co-located with each light source, and converting the signals obtained by the light sensors into distance measurements in order to create a distance map of the light sources.

US 2016/323393 A1 discloses methods, systems, and apparatus, including computer programs encoded on computer storage media, for presence determination. One of the methods includes for one or more user devices having one or more associated users, determining a current location of a user, wherein the current location is associated with a particular space of a plurality of different spaces.

EP 3128817 A1 discloses a commissioning and verification method for a VLC based indoor positioning system and deals with methods of populating a commissioning database for a VLC based lighting system. A lighting system comprising multiple luminaries installed at known locations in an environment. Each luminaire is configured to emit a unique luminaire identifier into the environment. A database holds multiple location identifiers, each of which identifies one of the known locations. A route through the environment is identified based on the location identifiers, the route traversing a plurality of the known locations. Data generated by moving a photodetector along the route though the environment is received, the data conveying a sequence of the luminaire identifiers detected by the photodetector from luminaries encountered in moving along the route, the sequence being in order of detection. A database update is performed by, for at least one luminaire identifier in the sequence: identifying its position in the sequence, and updating the database based on the at least one luminaire identifier and its identified position in the sequence.

SUMMARY

However, after initial installation of a lighting system at a site, the position of luminaires and/or sensors may be changed but not necessarily get updated in the Cloud or backend database. Other changes such as addition or removal of luminaires and/or sensors may also happen. When such recommissioning happens, it is important to properly associate the various data streams with proper context information. In most systems this involves an (error-prone) manual intervention where a commissioner or user collects operational data of the lighting system while moving around in the environment illuminated by the lighting system and reports the collected data to the Cloud or backend database. As a result it would be desirable to develop a way in which such changes may be detected automatically.

This invention considers a connected lighting system with multiple sensors and luminaires connected to a backend or control system, with data available at an analytics engine. The possibility to collect and analyze data from a connected lighting system offers new data enabled analytics and services around energy management and space utilization. Examples of such analytics are lighting energy consumption trends that help to identify lamp and/or sensor failures, and space utilization metrics that indicate utilization of different application areas.

One of the challenges in delivering such analytics and services is recommissioning. Recommissioning is where, after an initial installation, the position of luminaires and/or sensors change over time at a site. These changes may however be unknown at the analytics engine and can subsequently have an impact on data interpretation.

The inventors have realized that in order to solve the above problem the following needs to be addressed: automatically detecting recommissioning so that resulting analytics remain reliable. Thus the issue becomes one of how to automatically detect recommissioning?

The present description presents a method for determining if there has been an action of recommissioning, wherein the word 'recommissioning' describes the action of changing a connected lighting system such that the original commissioning information is no longer accurate. That is to say the present application is concerned with automatically detecting the occurrence of a recommissioning, where a device has moved location within an already commissioned connected lighting system. After using the presently described techniques to detect the occurrence of an unrecorded commissioning change in the first place, corrections to the commissioning information may then be made to account for this action, either manually or automatically. Such corrections being those described in the prior art method mentioned above. U.S. 8,159,156 discloses a process for detecting the position of a luminaire, but it does not disclose how to detect or trigger when such a process needs to be re-run.

The inventors have realized that automatic detecting of recommissioning can be achieved by detecting changes in a set of lighting signal features and corresponding IDs (e.g. RSSI/SSID) within a neighborhood (VLC codes, database entries), based on clustering techniques. In general, a "lighting signal feature", "signal feature" or simply "feature" can be defined as a characteristic or property of signal generated by a luminaire and/or sensor of a connected lighting system. "Data clustering" refers to the classification of data into different groups or the partitioning of a data set into different subsets wherein each data in the subset ideally shares some common traits. These lighting signal features are used to characterize a data cluster. Detection of recommissioning will show outliers in respect of one or more lighting signal features for a location. Similarly by detecting changes in burning hours profile corresponding to a location with respect to time, a location change may also be detected by detecting a change in burning hours (e.g. when a profile was updated, but the location on the map was not update).

Hence, according to a first aspect disclosed herein, there is provided a method of detecting a change in a lighting system comprising a plurality of devices each comprising a luminaire and/or a sensor, wherein each respective one of the devices has a respective location, recorded in a commissioning database, in association with data reported by the respective device; the method comprising:
identifying a subset of said devices located within a predetermined spatial demarcation;
automatically monitoring a respective value of a characteristic of each of the devices in said subset, thereby forming a data cluster comprising the values of said characteristic for the devices in said subset; automatically detecting that one of the devices in the subset has been changed by detecting a shift in one of the values relative to the rest of the values in the data cluster; and in response to said detection, automatically outputting an indication that the commissioning database is likely to require updating to reflect said change.

For instance, the spatial demarcation may be a particular room or rooms, a particular building, a particular zone within a room or building, a certain side of a building, or a specific outdoor region. In one particular example the spatial demarcation may be a control zone associated with the devices of the subset, for example a zone in which a mobile user terminal is permitted access to the devices (such as to control the emitted illumination in the case where the devices comprise illumination sources), but outside of which the mobile user terminal is not permitted access.

In embodiments, one, some or all of the devices of said plurality of devices or in said subset of devices, may each take the form of a luminaire each comprising a respective one of the illumination sources, and optionally a respective one of the sensors. Alternatively or additionally, one, some or all of the devices of said plurality of devices or of said subset, may each take the form of a dedicated sensor unit comprising a respective one of said sensors (but not an illumination source).

In embodiments, said outputting may comprise outputting an indication to a user such as a commissioning technician or operator of the lighting system, alerting the user that the database needs updating to reflect the change. Alternatively, said outputting may comprise outputting a signal to trigger the lighting system to automatically detect a new location of a moved device using wireless signals transmitted to or from the devices combined with any suitable localization technique, such as triangulation, trilateration, multilateration or fingerprinting. Another possibility is that the signal prompts the user or automatically causes the system to exclude a moved device from an analysis performed upon the data in the database.

The method may be performed by any suitable component or components of the lighting system, e.g. on a server, or in a lighting bridge or dedicated control unit. The functionality of the method may be implemented by software stored on computer-readable storage and arranged to run on one or more processing units of the component(s) in question, or may be implemented in dedicated hardware circuitry of the component(s), or any combination of hardware and software.

In embodiments, the detecting of said shift comprises evaluating a metric combining the values of the data cluster, and detecting a shift in said metric.

In embodiments, said metric comprises a centroid of the data cluster values.

In embodiments, said characteristic comprises a property of a wireless signal received by a wireless node from each of the devices in said subset, the values being respective measurements of said property of the received signal.

In embodiments, said property comprises received signal strength and/or time-of-flight and/or angle-of-arrival.

In embodiments, said wireless node is another of the devices located within said spatial demarcation.

For instance the wireless signal may be an RF signal, an ultrasound signal or an optical signal (e.g. in the case where each device comprises an illumination source, a coded light signal embedded in the respective emitted illumination).

In embodiments, said characteristic comprises a parameter measuring a degree of usage of each device.

In embodiments, said parameter comprises an energy consumption of the device.

In embodiments, each of the devices in the subset comprises a luminaire and said parameter comprises a number of burning hours of the luminaire.

In embodiments, each of the devices in said subset comprises a sensor and said characteristic comprises a sensor reading sensed by each sensor.

In embodiments, each of the sensors in said subset comprises a light sensor and the sensor reading comprises a light level reading, In embodiments, each of the sensors in said subset comprises a presence sensor and the sensor reading comprises a presence sensing result.

In embodiments, said characteristic comprises a control setting applied by a user to each device.

In embodiments, each of the devices in said subset comprises an illumination source and said setting comprises a dim level of each illumination source.

According to a second aspect disclosed herein, there is provided an apparatus for detecting a change in a lighting system comprising a plurality of devices each comprising a luminaire and/or a sensor, wherein each respective one of the devices has a respective location, recorded in a commissioning database, in association with data reported by the respective device; the apparatus comprising one or more processing units arranged to retrieve and run code from a computer-readable storage comprising one or more memory devices, the code being configured so as when run on the one or more processing units to perform operations of: for a subset of said devices located within a predetermined spatial demarcation, automatically monitoring a respective value of a characteristic of each of the devices in said subset, thereby forming a data cluster comprising the values of said characteristic for the devices in said subset; automatically detecting that one of the devices in the subset has been changed by detecting a shift in one of the values relative to the rest of the values in the data cluster; and in response to said detection, automatically outputting an indication that the commissioning database is likely to require updating to reflect said change.

BRIEF DESCRIPTION OF THE DRAWINGS

To assist understanding of the present disclosure and to show how embodiments may be put into effect, reference is made by way of example to the accompanying drawings in which:

FIG. 2 shows a table containing lighting data related to an example of a subset;

DETAILED DESCRIPTION OF EMBODIMENTS

The invention described herein considers a connected lighting system with multiple sensors and luminaires connected to a backend or control system, with data stored in a database being available at an analytics engine. The possibility to collect and analyze data from such a system offers new data enabled analytics and services around energy management and space utilization. One of the challenges in delivering such analytics and services is recommissioning. After initial installation, the position of luminaires and/or sensors may change over time at a customer site. Furthermore, other changes such as addition or removal of luminaires and/or sensors may also happen. These changes may however be unknown at the analytics engine. This has an impact on data interpretation. It would thus be desirable to develop methods to automatically detect commissioning changes.

Connected smart lighting systems with multiple luminaires and sensors require complex commissioning and configuration software to manage the system. When recommissioning happens, a typical step taken is to check lighting control functionality, e.g. if an occupancy sensor triggers, do luminaires in that room turn on? However, recommissioning also has an impact on the data generated by luminaires and sensors and their association with a location. As such, the inventors have realised that issues like 'how can recommissioning be detected automatically' need to be addressed.

Figure 1:
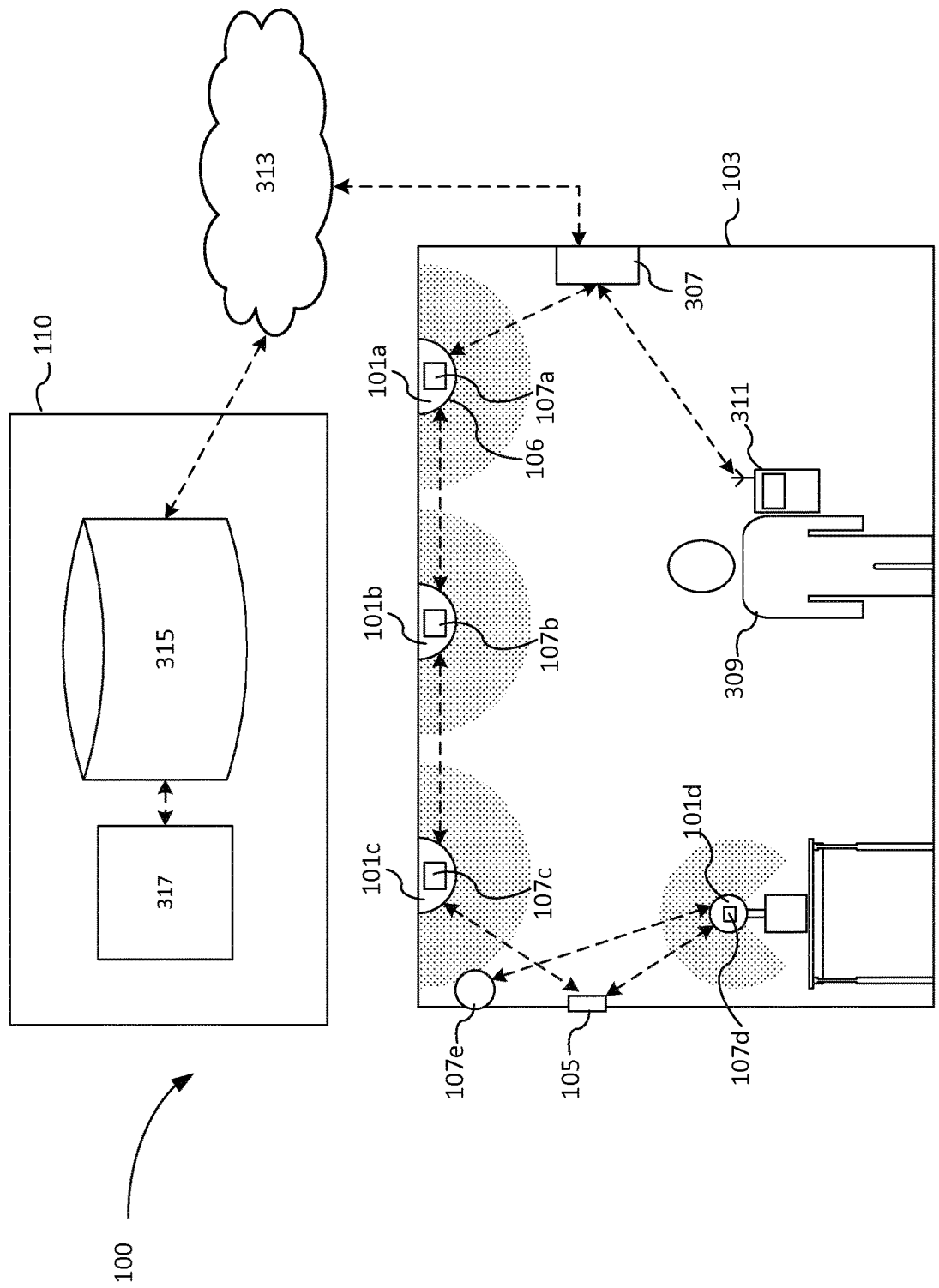
FIG. 1 shows an example connected lighting system.

FIG. 1 shows an example connected lighting system 100 according to embodiments of the present invention. An environment 103 contains a plurality of luminaires 101a-d and a switch 105. Luminaires 101a-c are ceiling type luminaires designed to provide illumination in the environment 103 from above. Luminaire 101d is a free-standing lamp type luminaire placed on a table designed to provide illumination in the environment 103 from a lower position than the ceiling type luminaires 101a-c. Each of the luminaires 101a-d may be any suitable type of luminaire such as an incandescent light, a fluorescent light, an LED lighting device etc. The plurality of luminaires 101a-d may comprise more than one type of luminaire, or each luminaire 101a-d may be of the same type. Luminaires may be co-located inside a lighting unit 106 which also houses one or more sensors 107. These sensors may be luminance sensors, occupancy sensors, or any other kind of sensor suitable for collecting data that may provide information on the connected lighting system and how it functions. A basic luminaire may consist simply of a light bulb or bulbs (e.g. LED, a filament bulb or gas-discharge lamp) and any associated support structure. Other luminaires may also comprise, for example, an associated casing or housing though others may not. A luminaire can take the form of a traditional ceiling or wall mounted room luminaire, or free standing luminaire (such as a floor or table lamp, or portable luminaire); or it may take a less traditional form such as an LED-strip embedded in or installed on a surface or item of furniture, a wall washer, or any other form of illumination device adapted to provide illumination specifically. Components for communicating with a bridge 307 (e.g. dedicated circuity, FPGA, processors and accompanying software (e.g. firmware) as applicable) may be incorporated in a light bulb with a standard fitting, to allow easy retrofitting of connected lighting functionality into existing, non-specialised lighting systems. However, this is not essential and in general these communication components can be incorporated at any suitable location in the lighting system to allow communication between the luminaires and the bridge 307.

It is noted that the terms "luminaire", "light source" and "illumination source" are used herein to refer to a device which emits not just any light, but specifically illumination, i.e. light on a scale suitable for contributing to the illuminating of an environment occupied by one or more humans (so that the human occupants can see within the physical space as a consequence). Note also that the term "lighting" also refers to illumination in this sense.

The switch 105 is shown in FIG. 1 as a wall-mounted switch and may be any suitable type of switch allowing user input to control the plurality of luminaires 101a-d. For example, the switch 105 may be a simple on-off controller switch or may allow for more complex control such as dimming and possibly even control of individual lighting characteristics such as hue and saturation. The switch 105 may also be a portable switch (portable remote control) capable of being moved from one environment to another. The term "switch" is used herein to refer to any control device allowing a user to input commands into the lighting system.

The plurality of luminaires 101a-d, the switch 105, along with a lighting bridge 307, and the plurality of sensors 107, form a connected lighting network. That is, they are all interconnected by wired and/or wireless connections, indicated by dotted lines in FIG. 1. In particular, FIG. 1 shows "chaining" connections such as may be implemented in a ZigBee lighting network, wherein it is not necessary for each device to be directly connected to each other device. Instead, devices are able to relay communication signals which allows for, for example, luminaire 101c to communicate with the lighting bridge 307 by relaying data through luminaires 101b and 101a to lighting bridge 307. However, it is not excluded that other network topologies may be employed. For example, a "hub-and-spoke" topology may be used in which each device is directly connected (e.g. wirelessly) to the lighting bridge 307 and not to any other devices in the network.

As another example, each luminaire in the network may be configured according to one communication protocol, such as ZigBee, and the switches may be configured according to another communication protocol, such as WiFi. Hence, it is appreciated that the luminaires may communicate with each other and the lighting bridge 307 without relaying data through a switch as shown in FIG. 1, and the switch 105 may communicate directly with the lighting bridge 307. In any case, it is understood that the lighting bridge 307 is able to communicate, by whatever appropriate means, with each other device in the lighting network.

Lighting bridge 307 is arranged at least to receive input (e.g. from back end 110, or switch 105) and to send lighting control commands to luminaires 101a-d. It should be understood that control logic may be stored elsewhere in the connected lighting system, i.e. at a system back end or Cloud platform, and not necessarily within the bridge 307. It should also be understood that any communication interface that allows the lighting system devices to connect to a network such as network 313 are not necessarily comprised within the same box as the lighting bridge 307.

FIG. 1 also shows a user 309 and user device 311 such as a smart phone. The user device 311 is operatively coupled to the lighting bridge 307 by a wired or wireless connection (e.g. WiFi or ZigBee) and hence forms part of the lighting network. User 309 can provide user input to the lighting bridge 307 via the user device 311 using, for example, a graphical user interface of the user device 311. The lighting bridge 307 then interprets the user input and sends control commands to the luminaires 101a-d accordingly. As mentioned above, the user device 311 generally allows for more complex control than the switch 105. For example, the user 309 may use the user device 311 to control an individual luminaire. In general it is desirable for the switch to control the luminaires in the same environment as the switch itself, i.e. in FIG. 1 switch 105 controls only luminaires 101a-d, but the user device 311 may control any luminaire within the lighting network. For example, the user 309 may use the user device 311 to control a luminaire in another environment, such as controlling a luminaire in a different room other than the room in which the user 309 and user device 311 are currently. This is particularly advantageous because the user device 311 is generally more portable than a switch (particularly a wall-mounted switch), and hence may be used at different physical locations. The user device 311 may be used to control the plurality of luminaires 101a-d to render a lighting scene, e.g. by the user 309 selecting the lighting scene and desired luminaires using a GUI of the user device 311.

As illustrated in FIG. 1, lighting bridge 307 may also be provided with a connection to network 313. This network may be a wide area network (WAN) connection such as a connection to the internet, or another intermediary network through which access to the internet may be achieved. This connection, as known in the art, allows the lighting bridge 307 to connect to networks like the internet or to any external data and services such as back end memory 315 and analytics engine 317. Note that the wireless connection between user device 311 and the lighting bridge 307 is shown in FIG. 1 as a direct connection, but it is understood that the user device 311 may also connect to the lighting bridge 307 via the network (i.e. the internet) 313. Memory 315 may be distributed throughout a back end 110 of the system on one or more computers, in one or more physical locations. System back end 110 may be located on one or more servers of network 313, and memory 315 may be similarly distributed, in one or more physical locations, as software, hardware, or any combination thereof, and connected through network 313. Network 313 may be e.g. the Internet, or any other network through which digital information and data may be sent, for example a network infrastructure of a Cloud computing platform implemented as a back end system.

The analytics engine 317 may be similarly distributed, in one or more physical locations, as software, hardware, or any combination thereof, on one or more computers of back end 110. Analytics engine 317 is configured to control and/or run any of the one or more selected analytics applications using the reported data from the devices of the lighting system. The analytics engine also outputs the results from the performed analytics to a user of the lighting system, indicating ways of adapting one or more features of the environment and/or lighting system.

Sensors 107a-e within the environment 103, can be either part of a lighting unit comprising a luminaire, or standalone sensors. The standalone sensor 107e is part of the lighting network in that it is arranged to communicate with the network via a wired or wireless connection. That is, the sensor 107e is arranged to at least be operatively coupled to the lighting bridge 307 in the same way the luminaires 101a-d and/or sensors 107a-d are. The plurality of sensors 107 may be any suitable form of sensor for detecting a property within the environment 103 which can be used to gather lighting data or link to lighting data. For example, the sensors 107 may be a microphone arranged to detect noise within the environment 103 and subsequently determine occupancy values. Sensors 107 may also be a motion detector, a camera, a thermal sensor, and/or a light or luminosity sensor.

Although shown in FIG. 1 as a single entity, it is understood that any suitable sensor or plurality of sensors may be used to provide the functionality ascribed herein to the sensors 107a-e. It is also understood that one or more of standalone sensors 107e can be positioned in any suitable location within environment 103 such that it may perform its designated function accordingly.

Given the above description, it is appreciated that the lighting system 100 shown in FIG. 1 is arranged to function as a connected lighting system and therefore that the luminaires 101 may be configured to behave according to one or more automation rules. For example, the bridge 307 may be configured to control luminaires 101a-c to respond to certain ambient lighting conditions sensed by sensor 107e (or a plurality of such sensors), in a way that provides a combined total lighting effect throughout environment 103. That is to say depending on the sensed intensity of light at sensor 107a, the dim level of any of luminaires 101a-c may be adjusted automatically to achieve a pre-defined desired luminosity for the environment 103. This pre-defined setting may be stored at database 315, accessed via network 313, and implemented by bridge 307 accordingly.

The present application considers a connected lighting system with multiple luminaires and sensors, where the connected lighting system may be divided into subsets, each subset is spatially demarcated and forms a control zone. Each control zone has multiple luminaires and multiple sensors. Each sensor may be for example, an occupancy sensor or a luminance/light sensor etc. The luminaires in a control zone may be occupancy-controlled by one of the occupancy sensors in that control zone. Lighting data (e.g. energy consumption at luminaires, dim states of luminaires, and occupancy values from occupancy sensors etc.) is reported back and stored at a Cloud or back end database. These different types of data, e.g. energy consumption, occupancy, light sensor values, lamp burning or effective operational hours, temperature, humidity, air quality, acoustic level, actuation level, requests handled, failure rate, reported error, and/or any other data values capable of being measured, are then stored as particular instances of data values of the data types. In general "lighting data" can be defined as data retreived from luminaires and/or sensors of a connected lighting system or derivatives of such data.

The environment as described herein comprises an interior space of a building. This interior space may comprise one or more rooms or zones. For example the environment as described with reference to FIG. 1 is a single room. However, the environment may comprise a number of rooms. The environment may as such be divided within the lighting system into controllable rooms or zones. The zones may comprise one or more rooms. The environment may comprise one or more zones. The zone may describe an area within a room of the environment. For example a large open room like a lecture theatre may comprise a zone located towards the front of the room where the presenter stands, and a further zone for the rest of the room where observers may sit.

FIG. 2 shows a table containing lighting data related to an example of such a subset. The data is available in the back end 110. Thus there is an interest, given actions causing recommissioning, to automatically detect these recommissioning changes. The inventors have realized it is possible to use the data already being collected to determine this recommissioning automatically.

For example, let us consider an instance of recommissioning.

FIG. 2 contains a table representing a data structure for data associated with a subset of devices of a connected lighting system. The subset contains devices such as luminaires and/or sensors, either as standalone units or combined in a lighting units (all generally referred to hereinafter as unit(s)) and grouped based on a common spatial demarcation, i.e. contained within the same room, or positioned within a certain spatial range of each other. The data received from these devices within the spatially demarcated subset is depicted here arranged by data type in columns, and by unit in rows. Here there are a plurality of units making up the subset, where all units comprise both a luminaire and a sensor. However, it should be understood that units comprising a luminaire or sensor alone, or units with a combination of any other number or type of connected lighting system device, such as a switch etc., could also be represented in this way.

Columns include column 202, which contains the timestamp (T) at which the information was collected. That is to say an absolute time, or an indicator for use in determining an absolute time, at which the data was collected or stored is contained here. In this example 4 different timestamps are used, t1, t2, t3, and tN. t1 is the earliest time, followed by t2, and then t3. tN is an indeterminate time some amount of time in the future, after time t3. These timestamps t1-t3 (and tN), may be determined with any appropriate interval, either regular or irregular.

Column 204 contains the luminaire ID (L-ID). This identifier may identify the luminaire within the particular subset of the connected lighting system devices, or identify the luminaire from all the luminaires within the whole of the connected lighting system.

Column 206 contains the energy (E) in watt-hours (Wh). This is the energy consumed by the luminaire since the last timestamp. That is to say the energy reading of Lum-1 at timestamp t2 is the amount of energy used by Lum_1 since the previous reading at time t1.

Column 208 contains the dim state of the luminaire (D %). A subset of units that do not comprise luminaires may not include this column, or may leave the data value entries for such units of the subset blank or devoid of information. The same applies for column 206. The dim state indicates the percentage of the total luminosity able to be output by that particular luminaire being output at that time. For example Lum_2 has a dim state of 90% at timestamp t1.

Column 210 contains the occupancy sensor ID (OS-ID) of the unit. Here the unit comprises an occupancy sensor and a luminaire and their entries are found on the same line of the table. The Occ_sensor identifier may identify the occupancy sensor within the particular subset of the connected lighting system devices, or identify the occupancy sensor from all the occupancy sensors within the whole of the connected lighting system.

Column 212 contains the occupancy value (O) measured at the time represented by that specific timestamp. For example at time t2 the occupancy value for occupancy sensors OS_1, OS_2, OS_3, OS_4, and OS_5 is 1, 1, 1, 1, and 0 respectively. This can be an indication of occupancy states where occupied is represented by a '1', and unoccupied is represented by a '0'. Alternatively the occupancy value could represent the absolute occupancy at time t2, for example a value of 3 if it is determined that the space covered by occupancy sensor OS_2 is occupied by 3 people. Further still this occupancy value could be an average of the absolute occupancy over time. For example the space covered by occupancy sensor OS_2 is occupied by 5 people for 5 seconds, followed by 1 person for 2 seconds. This would result in an occupancy value at time t2 of 6/7. In this example the total time period covered would be between time t1 and time t2.

Column 214 contains the physical location (L) of the unit. For example, here the unit containing luminaire Lum_2 and OS_2 is located in building 1, floor 4, position (x2,y2), indicated by [Bldg1;Floor4;(x2,y2)], where position uses Cartesian co-ordinates as determined within a pre-designated area. In this example the x-y co-ordinates designate a position on floor 4. However, it should be understood that any position within a pre-determined space could be indicated in this way. For example x-y co-ordinates could just as easily indicate the absolute position within a specific room on floor 4, e.g. corridor 1, or office 3, which may be included as an extra field for the location information. Further it should be appreciated that the pre-determined scale of the x-y co-ordinates could be any distance division determined based on granularity or accuracy requirements. For example x and y positions could form a grid of 1 meter granularity, or 2 meter granularity. This pre-determined granularity could depend on lighting unit density for the space in question, and could change between floors, or rooms of the same floor, or based on any other pre-determined spatial boundaries. The space in question may be a 2-dimensional space, or a 3-dimensional space, whereby in a Cartesian co-ordinate system a further z co-ordinate can be stipulated. This may be used for example where specific units may be located at different heights within a space. I.e. switches positioned half-way up walls, motion sensors positioned at ceiling height, or luminance sensors placed at desk height. Any suitable co-ordinate system can be used to represent the space in question. It should be appreciated therefore that any combination of the above location indications, and their elements, could be used so long as they are able to determine a location. An entire site, spanning multiple buildings and floors could be location identified using only a single set of co-ordinates so long as the site is mapped in this way. That is to say building 1, floor 1 could comprise co-ordinates x0, y0 to x20, y20, and building 1, floor 2 could be defined using co-ordinates x21, y21 to x31, y31, etc.

Consider the following example. At time instants t1 and t2, luminaire and sensor unit Lum_2/OS_2 (associated entries on rows 216 and 218) are at the location [Bldg1; Floor4;(x2,y2)]. Some time later, between time instants t2 and t3, luminaire and sensor unit Lum_2/OS_2 is moved to a new location. This new location is designated [Bldg1; Floor5;(x2',y2')] within the connected lighting system. Also at this same time (i.e. between t2 and t3), a different luminaire/occupancy sensor unit is placed at the location [Bldg1;Floor4;(x2,y2)], that is, the old location of luminaire/senor unit Lum_2/OS_2.

However, as can be seen in the location entries 220 in column of tables 2c and 2d, these location changes were not entered in the corresponding database entry. As such, at time instant t3 (and onwards), there is a luminaire and occupancy sensor with IDs different to that of Lum_2/OS_2 at location [Bldg1;Floor4;(x2,y2)].

Thus the energy, dim state and occupancy values data for this location (which is within the subset for Bldg1, Floor4) should come from a different luminaire and occupancy sensor that is not Lum_2 and OS_2. Further the information gathered from luminaire and occupancy sensor Lum_2/OS_2 should be contributing to and accounted for within the data belonging to a different subset.

In the present invention it is intended to acknowledge this discrepancy in data, and upon performing certain cluster analytics on the data determine not only that there is a discrepancy in the gathered data for the specific subset, but also subsequently to enable an indication to be output informing that a recommissioning has likely occurred.

Figure 3:
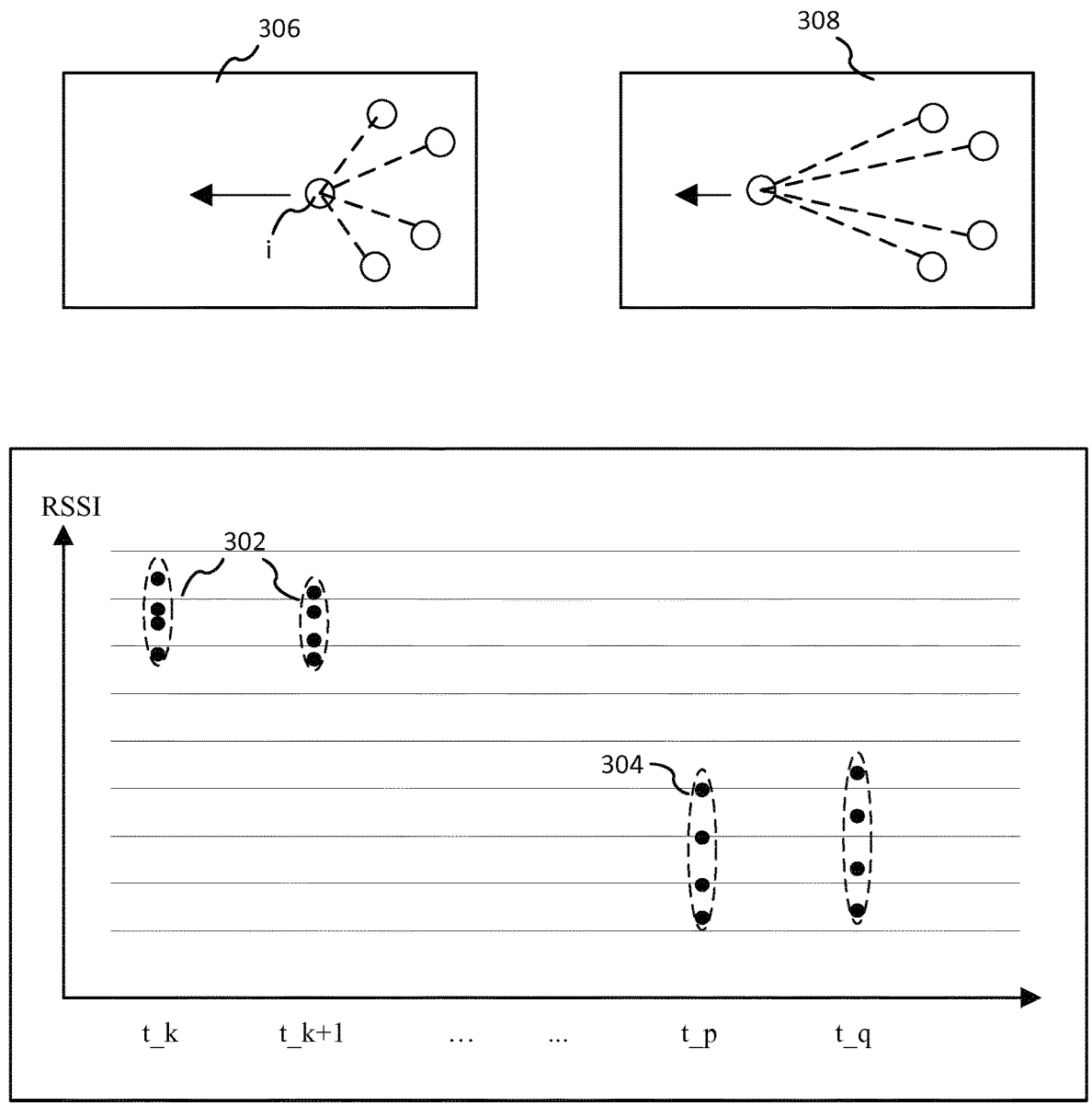
FIG. 3 shows a data clustering of RSSI data illustrating a detected outcome of a commissioning change.

FIG. 3 shows an RSSI data clustering for detecting of commissioning changes.

As stated above, the objective is to automatically determining that recommissioning has occurred. To do this, a set of ID/features are monitored over time. The said ID/features may be MAC ID/RSSI values, VLC code/optical signal strength, luminaire ID/light sensor value etc. Other respective measurements of properties/features of the received signal may also be used, such as time of flight and/or angle of arrival.

In FIG. 3 a data cluster has been shown for a subset of 4 specific units or devices. Here, the received signal strength indicator or RSSI has been used as feature and it corresponds to the strength of the radio signal at a wireless receiver due to transmission from a specific wireless device, in this particular case a specific luminaire/sensor unit. A specific wireless device is identifiable by its MAC ID, which forms the ID part of this specific ID/feature set.

Other ID/feature sets may include VLC, which refers to visible light communication, where the light output of a luminaire can be modulated with a code detectable at a VLC receiver. Thus the specific modulation code provides the ID to be determined, and the optical signal strength provides the feature to be measured.

In a given embodiment, one or more of the signal ID/features are monitored in the lighting system. More specifically, each of the sensors at a specific luminaire records the signal ID/features that it senses, each specific luminaire having both an ID and a location (where the locations may be indicated by a single location common to the luminaire and the sensor as in FIG. 2, or as separate data entries). The ID/feature data values are collected and linked to these locations, and a feature data cluster for the subset of lighting system devices is created using the collected data. As such any movement of a single ID would result in an observable change in the corresponding feature data value(s) and detectable from feature data cluster analysis.

A data cluster may be characterized for instance by a centroid and a radius. The centroid is the average of all points in a cluster. In other embodiments a medoid or the most representative point in a cluster may be used. Instead of the radius (or Euclidean distance), the Manhattan distance may be used, or any other suitable dimension. Thus e.g. a change in location of a specific luminaire could be determined based on a change in one of the characteristics of a feature data cluster. If signal ID/features are reported that do not belong to a particular feature data cluster at a given time instant, a likelihood of a new ID belonging to the feature data cluster is declared. If the likelihood value exceeds a pre-set threshold after a time duration, we declare that a new signal ID has been identified in the feature data cluster. Its location may be attributed to the location of on a non/no longer existent ID in the neighbourhood, e.g. in case of a unit replacement not yet processed by the back end 110.

The above discussed approach is illustrated in FIG. 3. Here $\{RSSI_{n,i}\}$ are the RSSI values received at n=1, 2, . . . , 4 neighbours from MAC ID i. The physical layout of devices can be pictured as shown in box 306. Here neighbouring devices 1-4 are illustrated as joined to the device with MAC ID i by dashed lines. The length of these lines are indicative of the signal strength measured at i.

From time t_k to some later time prior to time t_p, the feature cluster shows consistency in the centroid and radius 302. When a recommissioning occurs (at time t_p), for e.g. the luminaire with MAC ID i has been moved away, the RSSI centroid 304 goes down on the $RSSI_{n,i}$ axis due to a fall in magnitude of the RSSI values now measured at device i. The physical layout of devices at this later time can be pictured as shown in box 308. Here neighbouring devices 1-4 are again illustrated as joined to the device with MAC ID i by dashed lines. The length of these lines are indicative of the signal strength measured at i.

At time t_q, the likelihood value exceeds a pre-set threshold, and a commissioning change is declared. The pre-set threshold may be a likelihood value set such that it relates to the period of time over which the change in the centroid is observed, or set such that it depends on the degree of the change in the centroid of the cluster. For example, a desk lamp may move from one desk to another desk within a room, but only for a day while it is borrowed. This change in location may affect the centroid for a feature data cluster for the subset of lights in that room, but as this change is only observed for a single day, and the pre-set threshold of likelihood value based on duration of observation of this change is not exceeded, it may be determined that no automatic or manual processing of changes as a result of recommissioning is needed. However, if the desk lamp is not borrowed, and instead the owner of the desk lamp permanently moved desks, it can be determined that the period of time over which the change in the centroid is observed exceeds the pre-determined threshold, and the subset (or even specific luminaire), can be flagged for further processes needed as a result of recommissioning. It may be that the desk lamp is simply moved from one side to the other side of the same desk. In this case the change in the centroid of the feature data cluster may be observed over an extended period of time, however this change may not be significant enough to result in a likelihood value that exceeds the pre-set threshold. Thus again no flag or indication is output that signals that the subset in question should undergo some further processes due to a likely recommissioning.

Alternatively, the signal ID is localized using any known localization technique (depending on the signal features received), such as based on the received signal strength (e.g. RSSI) or time of flight (ToF) of a light-based VLC signal or radio signal. Similarly, if an existing ID is not found after a specific instant of time, then that ID is declared missing once the likelihood value falls below a specified threshold.

For this analysis a process called cluster analysis can be used. Cluster analysis or clustering is the task of grouping a set of objects in such a way that objects in the same cluster are more similar to each other (in some sense) than to those in another cluster(s).

Clustering can therefore be formulated as a multi-objective optimization problem. The appropriate clustering algorithm and parameter settings depend on the individual data set and intended use of the results. In this case, the data set can be seen as the data received from all units of the connected lighting system, or only the data received from units belonging to a specific subset. Further it may be that the data is analyzed with an intended result to show feature clusters pertaining to specific types of data points such as occupancy, or given a larger data set it may be that the data is analyzed such that location clusters are formed where data in a cluster is likely to be received by units in the same physical location. Cluster analysis as such is therefore seen not as an automatic task, but an iterative process of knowledge discovery or interactive multi-objective optimization that involves trial and error. It is often necessary to preprocess data or modify model parameters until the cluster analysis achieves the desired results or shows the desired properties.

Figure 4:
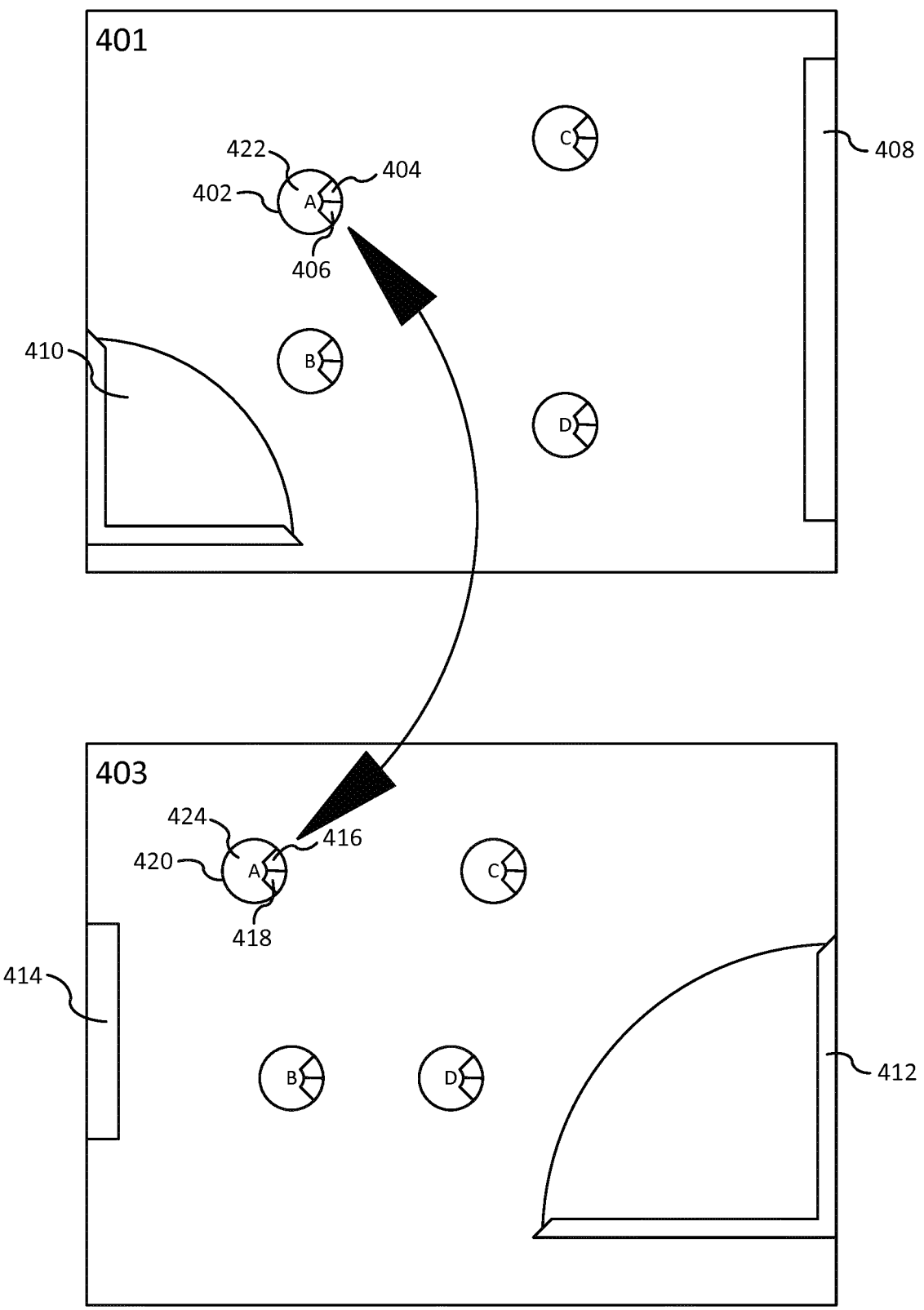
FIG. 4 shows an example of a recommissioning.

FIG. 4 shows two rooms, "Room 1" 401 and "Room 2" 403. Both rooms contain luminaire/sensor units A, B, C, and D. Room 1 further comprises a large window 408 and a door 410. Room 2 further comprises a door 412, and a window 414 smaller than the window of room 1. The unit A 402 comprises an ambient luminance sensor 404 and an occupancy sensor 406. Initially unit A 402 in room 1 is configured to carry out certain dim state actions at the luminaire based on the illumination measured in the room by the ambient luminance sensor 404. Room 1 is not regularly used, and as such data received from the occupancy sensor 406 typically reports a low level of occupancy. Room 2 also comprises a luminaire/sensor unit A, which in turn also comprises an ambient luminance sensor 416 and an occupancy sensor 418. Room 2 does not receive much illumination through window 414. However, room 2 typically is used more regularly than room 1, and as such unit A 420 in room 2 is initially configured to carry out certain dim state actions at the luminaire based on the occupancy measured in the room by the occupancy sensor 418.

In one embodiment, at some later time, unit A (402) of room 1 and unit A (420) of room 2 are swapped. No amendment is made to the data received at the system back end as a result of these changes in unit locations. Thus their locations are changed only physically, and the data gathered by each respective unit and reported back to the back end also changes because the data gathered represents a different location. For example, unit 402, which is still configured to carry out certain dim state actions at the luminaire 422 based on the illumination measured in the room by the ambient luminance sensor 404, begins to report to the back end significantly lower energy values, significantly lower dim state values, and significantly higher occupancy values. As a result a feature data cluster for the subset of units A-D of room 1, based on any of the types of data gathered by unit 402, will show a significant change after unit 402 has moved to room 2. This change can be determined by looking at the data using cluster analysis. It may be that the data now returned by unit A 402 is significantly different such that the data points align themselves with a completely different centroid (if the data included in the analysis also comprises data gathered from other locations for example), or the difference in data returned by unit A 402 may be just enough to change the center-point or radius of the centroid created for the feature data cluster of room 1 which now comprises the altered data from unit A 402. In this way the data points automatically change the way they cluster in a cluster analysis in such a way that it can be determined that a change to the subset of units in room 1 has occurred. Detection of recommissioning will show outliers for a location. The determination may be made using a pre-defined threshold difference to detect the recommissioning, for example a difference in the center-point or radius values of a particular cluster.

The above example is one where neither the profile of the luminaire and/or sensor unit, nor its location on the map was updated. For example, the rules governing the behavior of the luminaire, the control logic or control functionality of the luminaire were also not changed at the time of its relocation. In other real world situations it may be that the unit did have its functionality or profile changed (e.g. to match those around it at the new location and thus fitting in with the functioning of the surrounding units), however the location within the database may still not have been changed.

When a profile was updated, but the location of the unit at the system back end was not updated, the unit will begin to return data that will be similar to the other units in its vicinity. However, within the database at the system back end the unit is not (yet) part of the subset of units in its vicinity. All data analyzed for the original subset where the relocated unit was part of will be inaccurate and continue to be inaccurate by inclusion of the data from the relocated unit. Determining when the analytics engine 317 returns data that is inconsistent and subsequently being able to determine why may result in removing the unwanted data from the data subset, and allows analysis such as efficiency analysis on the corrected data subset to compensate for recommissioning.

As stated above, a location change may also be detected by detecting a change in burning hours when burning hours would be location dependent. For example take unit 420 originally of room 2 in FIG. 4. On moving this unit to room 1 the unit may have had its profile altered such that it is now configured to carry out certain dim state actions at the luminaire 424 based on the illumination measured in the room by the ambient luminance sensor 416. As a result of this the burning hours of the luminaire 424 may significantly increase (assuming here that the total hours of low light or darkness in room 1, triggering illumination from luminaire 424 in room 1, are more than the hours of occupancy of room 2, triggering illumination from luminaire 424 in room 2). The burning hours data gathered from unit 420 at the back end of the system will however continue to be included in the burning hours of the subset comprising the units originally of room 2. Thus a burning hours profile for that particular subset will show an inconsistency. Again a pre-set threshold may be used to determine when an inconsistency is significant enough to imply a recommissioning event has likely taken place. Thus values exceeding a pre-set threshold can be considered to have a likelihood value that recommissioning has occurred. It may be that a first pre-set threshold is used to separate consistent and inconsistent data, and a plurality of likelihood values are assigned to all data found to be inconsistent based on the extent to which the inconsistency exceeds this first pre-set threshold. For example, three different likelihood values may be assigned to inconsistent data where values exceed the pre-set threshold and fall within one of three bounded ranges. As such actions taken may depend on the range in which the inconsistent data falls. If the pre-set threshold is exceeded by a large amount and falls within an upper boundary, the result may be that the raw data responsible is removed from future analytics engine processes. If the pre-set threshold is exceeded by an amount falling in the middle range, the result may be that the data is included in analytics engine analysis but with a lower weighting than other data. If the pre-set threshold is exceeded by an amount falling in the lower range, the result may be that the data is simply flagged for attention. This threshold and likelihood value assignment may also be used when analysing the centroids created using cluster analysis as discussed above.

There are two possible causes of error that may occur upon recommissioning, and should therefore be considered. A first cause of error is where neither behavioural commissioning nor the location commissioning were updated for a specific device after recommissioning. A second cause of error is where behavioural commissioning was done correctly, but no corresponding location commissioning was made for the specific device. To identify the second situation the behaviour of a device, deduced from signals (e.g. light sensor measurements, control pre-set settings) at a particular location, is analyzed over time. A change in behavioural profile is considered to be indicative of a change in location of that device. Having determined a change in location, re-associating data received at the back end to the right feature data cluster can be done based on device bound associations, location bound associations, or both device and location bound associations.

Device bound data may be used for diagnostics applications such as luminaire/sensor health, burning hours, luminaire/sensor data such as energy or occupancy values, the corresponding data being associated with the ID of the luminaire/sensor. Thus, for example, to obtain burning hours of luminaire with ID Lum_k, data elements Energy_k and Dim_state_k corresponding to entries under Lum_k are processed over time. More specifically, consider that Dim_state values are being stored for each luminaire, where Dim-state is the fraction of the light output of the luminaire relative to the maximum light output the luminaire can produce, with a value between 0 and 1 (or alternatively between 0% and 100%). The burning hours of luminaire k is then computed as:

$$\Sigma_n \text{Dim\_state\_k}_n(@\text{Lum\_k}) * A \Delta t_n$$

where $\Delta t$ is the time period over which Dim_state samples are recorded/stored (for example, each sample may be stored over 15 mins); $\Delta t_n$ is the n-th time period and Dim_state_k$_n$ is the dimming state of luminaire k in that n-th time period and based on the Dim-state samples stored during $\Delta t_n$ (for example by averaging Dim-state data values).

Location bound data may be used for example when considering temporal data trends such as the energy trend or occupancy sensor value time pattern, the corresponding data being associated with the luminaire/sensor location. Thus, when processing energy trends at a certain control zone or across different control zones (e.g. at different levels of hierarchy), all locations that fall in the control zone(s) of interest (e.g. within a hierarchical level) are considered and energy values for those locations are aggregated to the said control zone(s) (e.g. within a hierarchical level), over time. At each time stamp, this aggregation may constitute a sum (or average) of the energy levels from such locations.

A control pre-set setting as mentioned above, refers to a defined behaviour corresponding to a control input. For instance, it may be that when a space becomes unoccupied (while the neighbouring spaces are occupied), the controller set-point drives the luminaire(s) to achieve a light level (e.g. 300 lux) that is lower than if the space was occupied (e.g. 500 lux). This strategy would save lighting energy, while being visually comfortable to users still working in the neighbouring spaces.

Both device bound data and location bound data may be used, for example, when considering spatial data maps (of e.g. energy or occupancy), in which data (of e.g. energy or occupancy) is associated with a map location using luminaire/sensor ID. The spatial data map is a spatial representation of one of the data types retrieved based on luminaire/sensor ID.

The key idea is thus to associate data by way of device or location binding depending on whether the physical parameter of interest being analyzed is a property of the device (e.g. lamp burning hours is a property of the luminaire) or the location (e.g. average energy consumption in a specific office room), or both (e.g. occupancy distribution spatial heat map).

When performing data analytics on gathered data, it is important to be able to pull out data based on a particular property of interest. For example if all data at the back end is linked to a device ID, but you are only interested in a particular location in an area and not the specific devices within that area, then it should be possible to access information based on the location information of those devices. It may therefore not be desirable to have to retrieve this data by way of the specific device IDs of the devices in that area.

Thus the inventors believe that by associating gathered data with either device identifier (ID), device location, or both depending on the type of analytics the gathered data is likely to be used for, a more reliable and efficient way of associating data for analytics is possible.

These methods of detecting a change in a lighting system as described above are of particular use during recommissioning, as discussed. Primarily when devices change location, e.g. move from one room to another, within a connected lighting system, as a result, the relevance of the data collected from a relocated sensor or luminaire may change as well.

There is thus a need to capture a change in location of a device in relation to the data gathered by that device, and to know how to treat the data when relocation happens. It is therefore important to tie certain physical properties to certain sensor data. Some data has to be tied to location and some to both device ID and location, the device ID being a unique identifier ID of an individual device or a group or category of devices of the lighting system.

The desire is to give meaning to data by performing analytics relating to a particular property, e.g. performing an analysis on the number of occupied meeting rooms over time compared to the maximum capacity of those rooms, can indicate the efficiency of the use of this space as a meeting room. If something changes to the meeting room(s) (e.g. a meeting room is added or removed, or a meeting room is moved (i.e. repartitioning and or reallocation of space), or a luminaire/sensor in a meeting room is moved), the results of that analysis do not maintain the same level of relevance. That is to say some amount of the data being used is no longer relevant to the scenario being analyzed, and therefore the output will be misleading.

Prior art database structures typically use device ID as a key to retrieve specific data from the device and to retrieve the device's location. However, the data is sassociated with the device ID, so when the analytics to be performed only relates to a feature linked to a location, the data for analyzing this feature is not directly linked to that location but linked via device ID locations, e.g. the sensor ID and sensor location are tied together in the database structure. This link can vary over time due to recommissioning. By associating the gathered data with location, device identifier, or both, depending on the type of data/feature or analysis it is to be used for, the analytics will be easier to implement and more reliable in respect the correct data set.

For example, consider a luminaire or sensor device which has been moved from a first location to a second location. Where the feature of interest is related to the first location, performing an analysis using the data from the luminaire or sensor that is incorrectly still assigned to the first location but is actually already located at the second location makes the analytics meaningless.

It is therefore recognized that certain types of data need associating or tying to certain physical properties, e.g. physical location.

For some data, device ID and not device location will be associated with the gathered data, e.g. burning hours which should not track a location as it is considered to be a device specific characteristic. For some other data, device location and not device ID will be associated with the gathered data, e.g. an energy consumption map which should be extracted from data for a specific room, regardless of specific device ID's. For some data, both device ID and device location will be desired to be associated with the gathered data, e.g. energy or sensor data spatio-temporal trends in a heat map which require a specific device with a specific location to be known.

Figure 5A:
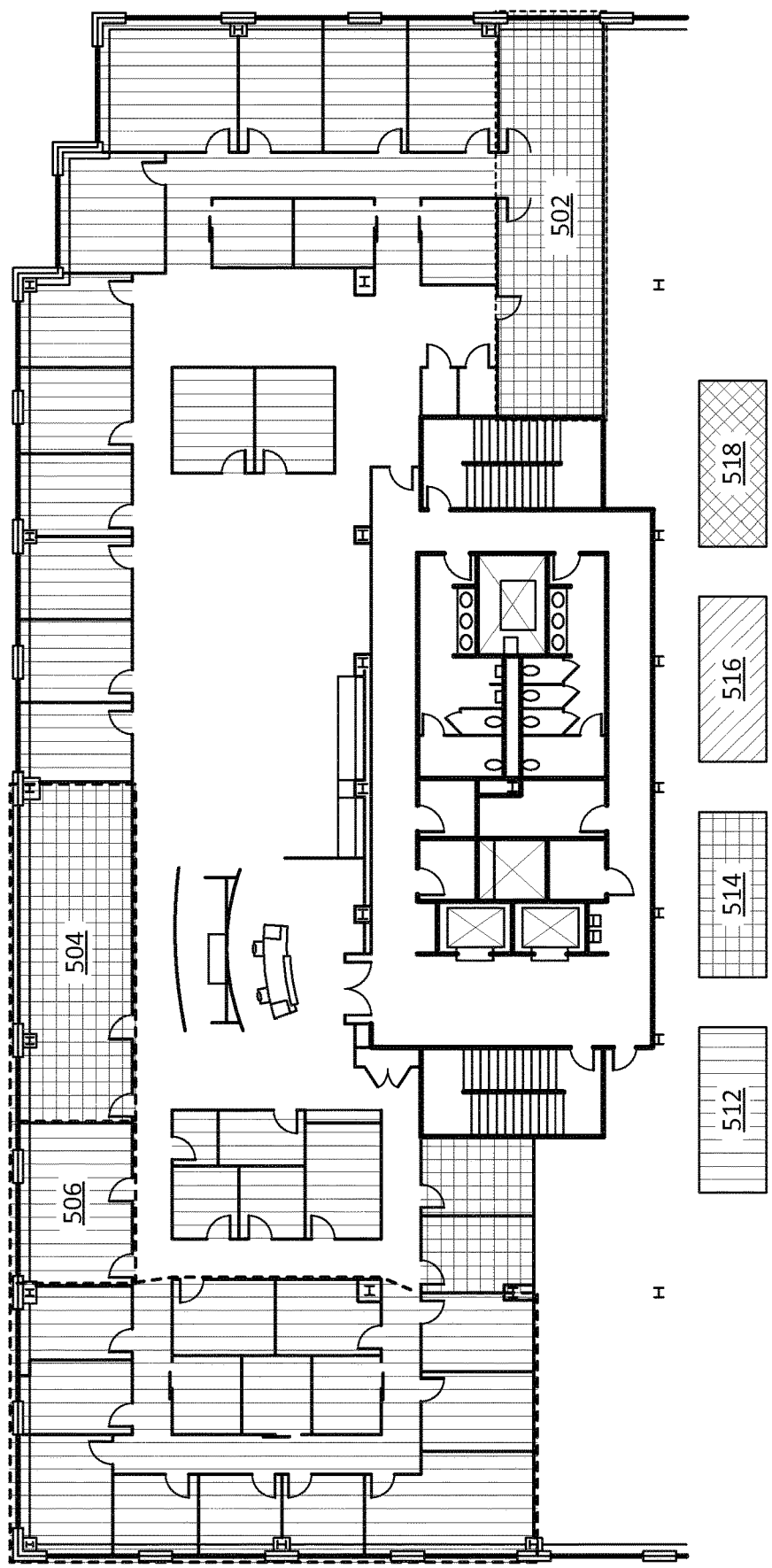
FIGS. 5A and 5B show floor plan 5A and floor plan 5B respectively, wherein floor plan 5B illustrates floor plan 5A after one or more recommissioning actions have taken place.
Figure 5B:
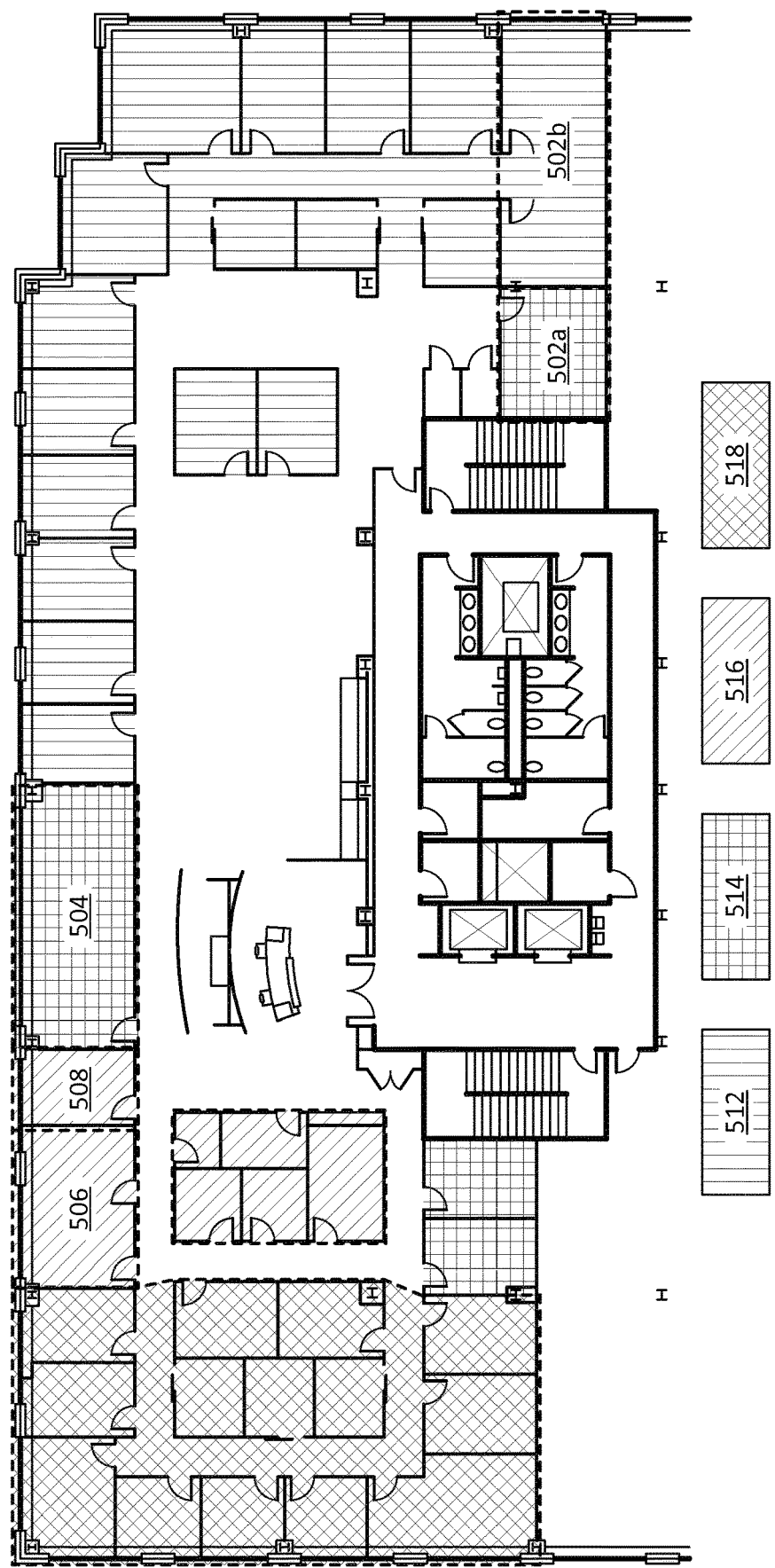

Consider the example illustrated by FIGS. 5A and 5B. FIG. 5A shows a floor plan with certain spaces filled with a pattern. The pattern indicates the type of space or location function. Fill pattern 512 indicates locations for cell office space. Fill pattern 514 indicates locations for meeting room space. Fill pattern 516 indicates locations for breakout/project spaces. Fill pattern 518 indicates locations for open office spaces. For example, cell type offices are typically offices with one or two occupants and are fully enclosed and separated from other work spaces. These cell type offices are shown in FIG. 5A and 5B containing a bar fill pattern. The floor plans 5A and 5B also comprise meeting rooms, indicated using a square fill pattern. By performing analytics on data gathered from a lighting system of floor plan 5A, it is possible to determine whether the use of space with these purposes is efficient or not. It is also possible to determine what kind of reallocation may be be carried out to increase the efficiency of this space. For example it may be that reallocating some cell offices as meeting rooms would increase the efficiency of the space. It may be that introducing or removing a type of space could result in a more efficient used of the space.

Floor plan 5B shows a possible suggested reallocation of space as a result of such space management analytics. That is to say that an analysis performed using occupancy data for the particular floor plan 5A established that the meeting rooms and some cell offices are underutilized. I.e. occupancy level analysis over multiple monitoring periods revealed that the utilization of meeting rooms is low and the utilization of specific cell offices is low. As a result space reallocation is performed such that the number of meeting rooms is reduced (or alternatively the size or space taken up by meeting rooms is reduced), and some particular cell offices are repurposed.

This reallocation may entail the installation, removal or repositioning of partition walls to create new spaces suitable for specific purposes. These types of spaces may have existed previously on the floor but in another location, may not have existed at all, or some types of space may be removed altogether. For example referring back to FIG. 5A, meeting room zone 502 has been divided into two zones in floor plan 5B, where 502*a* is completely separated from 502*b*. This may have been achieved by the addition of a wall (where previously the space 502*a* and 502*b* comprised a single meeting room or series of adjoined rooms). Location 502*b*, previously part of the meeting room 502, is subsequently turned into a cell office. By reducing the size of the meeting room space on this floor, the previously underutilized meeting room space is now utilized to a greater extent as a (smaller) meeting room and an additional other type of space (e.g. cell office space 502*b*). Subsequent space optimization measures may indeed indicate an increase in space utilization. A reason could have been that previously this particular meeting room was rarely used for meetings of significant enough a size to fully occupy the meeting room space, especially if also meeting room 504 of that or similar size was potentially available. The performing of analytics on the available sensor data may thus indicate potential space management improvement options.

Spaces 504, and 506 are initially designated as meeting room and cell office respectively. However, after reallocation of space as indicated in FIG. 5B, the meeting room 504 is reduced in size, and the leftover space 508 is added to that of 506 and labelled with a new type of space and a new function, referred to breakout or project space. Thus the unutilized or underutilized cell office 506 and meeting room 504 are reallocated or reassigned to spaces of a more appropriate capacity and function to increase efficient use of the available space. Such relocation and reassignment of spaces may be implemented after consultations with the customer or facility management of the building or floor. The space portfolio reorganization can be used to better optimize space usage (possibly across multiple floors) and to better serve the needs of employees. After implementation of such space management advice, the effectiveness of the advice can subsequently be monitored over mutliple periods. However, this further analysis requires a correct assignment of space categories (e.g. cell offices, meeting rooms, and/or open office spaces) to spaces and thus requires proper lifetime management of Cloud or backend database. That is to say area definition information must be updated when changes are made to the area, such that the function or purpose of that specific area is correctly represented. For example on changing the location 506 from a cell office to part of a breakout space, it is important that the information about this change is correctly input into the could or backend database such that all information gathered from this location is analyzed as breakout space data rather than included within data for analytics for cell offices.

To elaborate on this consider space 502 of floor plan 5A, but now assume this space to comprise two meeting rooms in total (as divided in floor plan 5B), being 502a and 502b. In this example the entire space 502 was/will always be considered to be of a type 'meeting room', and thus all data pertaining to these spaces may be associated with properties of the designated location, i.e. 'meeting room', within the Cloud or backend database (or retrievable from some other accessible memory store). Now assume it is desirable to retrieve data for e.g. energy consumed by all meeting rooms during one month. However after two weeks (i.e. half way through the one month data collection period), meeting rooms 502a and 502b are reallocated as one meeting room and one cell office respectively (as shown in floor plan 5B). Thus the first two weeks of the data relate to two meeting rooms 502a and 502b, and the last two weeks of data relate to one meeting room 502a and one cell office 502b. If this reallocation is not correctly recorded in the Cloud or back-end database, analysis performed on this data raises incorrect results. We could end up with either the correct data but with the wrong interpretation i.e. data for data from two meeting rooms now being allocated to only one meeting room. Or we could end up with incorrect data and an incorrect interpretation by incorporating the cell office data into the meeting room analytics. Here it is not recognized that only the data gathered by devices of 502a should be included in the meeting room analytics, nor that the data gathered by devices of 502b should be excluded. Thus it can be seen how incorrect data association can result in incorrect analysis results. Correcting these errors afterwards not only required correcting the association such that new data is associated with the right location/purpose but also requires changes in the already gathered and stored data to correct the associations in the already gathered and stored data. The above situation can be prevented by properly associating the gathered data to either location and not device ID, device ID and not location, or both device ID and location. This association can depend on the type of data being considered (that is the feature it relates to) and the analytics being performed (the way the data is intended to be used e.g. energy efficiency).

It is also possible to provide a context to the data and store the data together with the context. A context (also referred to as a contextual element or contextual property) could indicate a room type as mentioned above, or a room surface area, etc. Each context may include a certain lifetime. That is to say, a start and/or end date within which the specific contextual element is valid or accurate (i.e. the time period over which the context is correct e.g. specified by date and perhaps even time of day, and/or a duration starting or ending thereon). This context could be entered manually at the time of the physical action of recommissioning, or thereafter based on automatically detected recommissioning as disclosed herein.

Figure 6A:
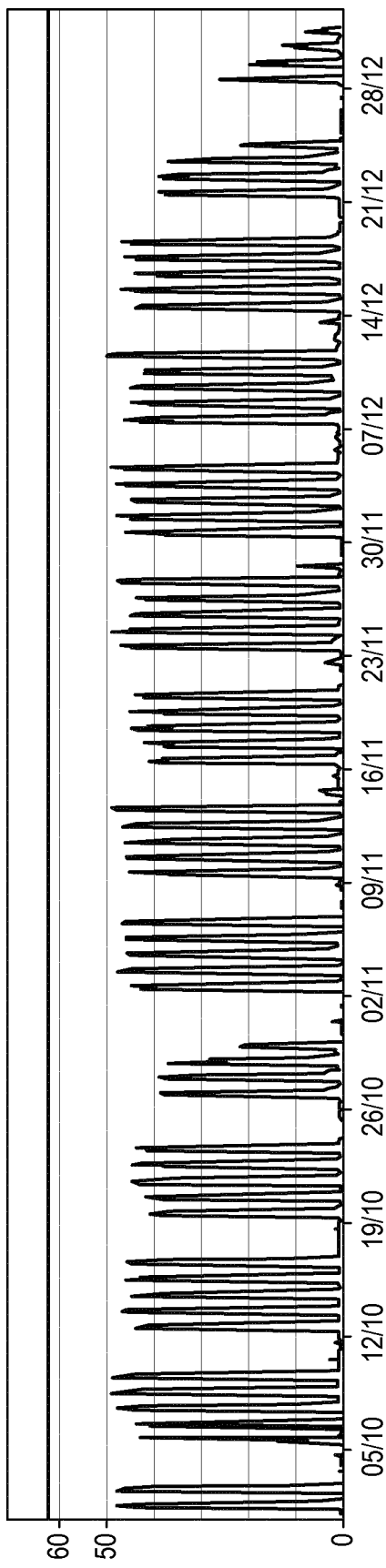
FIGS. 6A and 6B show two graphs illustrating the time trend of occupancy level aggregated over all meeting rooms, where graph 6A comprises data reported before a recommissioning, and graph 6B comprises data reported after a recommissioning.
Figure 6B:
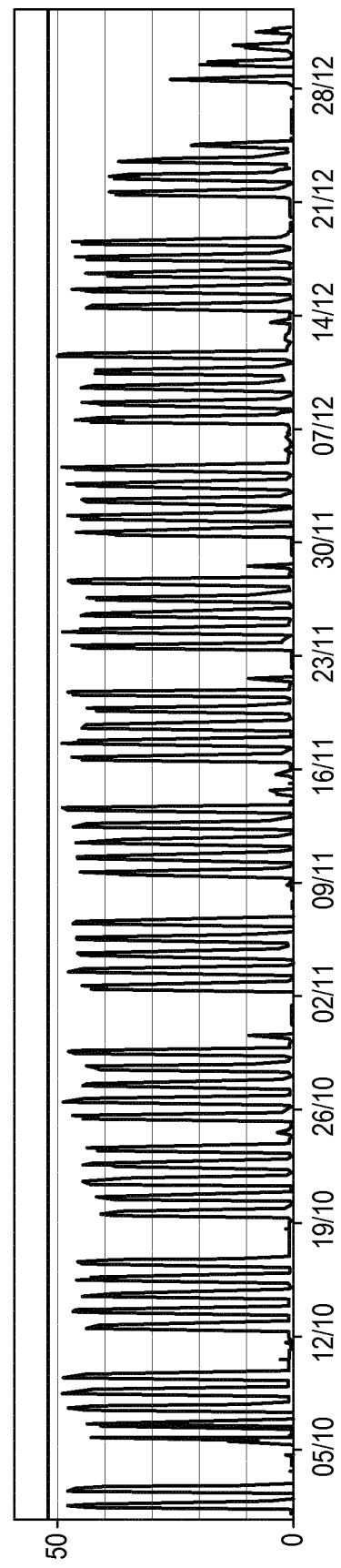

Thus by correctly associating data using the above stated principles, analytics based on the gathered data can be considered to be more accurate and also more useful. FIG. 6 shows two graphs illustrating the time trend of occupancy level aggregated over meeting rooms. These occupancy profiles comprise sensed data from occupancy sensors within floor plans like those of FIG. 5A and 5B. Graph 6A corresponds to the occupancy of 60 meeting rooms (similarly allocated as those of floor plan 5A) over the dates shown on the x-axis. Graph 6B corresponds to the occupancy of 50 meeting rooms (similarly allocated as those of floor plan 5B) over the dates shown on the x-axis. It can be seen that by taking actions resulting from analytics performed on correctly associated data, e.g. reallocating whole or partial meeting rooms to other functions, the utilization of meeting room space has been optimized.

In the process of running the analytics, an analyst may choose an analytic metric (say occupancy time trend over all meeting rooms in a building within the time period of January 2017) to run on the reported and stored data values. The analysis may be configured to run upon selection, or at a regular programmed time interval, a pre-selected time of day, a pre-selected data of the month, a pre-selected time of the year etc. Then in order for the analysis to compute the relevant occupancy metric values, different pieces of information need to be obtained, and associated accordingly, to get the data values of the occupancy sensors in all meeting rooms in the stated time period. The first piece of information is to determine all valid meeting rooms that exist in this time period. The second piece of information is to determine all the occupancy sensors that exist in these meeting rooms (determined using the first piece of information). And the third piece of information is to determine the data from the locations of occupancy sensors (obtained using the second piece of information).

Analytics may also be performed for the purposes of optimizing energy efficiency or consumption. Changing to an open office area from a cell office might affect lighting emission strategy (e.g. how the lights are triggered) and subsequently influence energy consumption. For example, whether a luminaire is triggered by ambient light conditions (daylight levels) or by occupancy (e.g. detection of motion) may be relevant in assessing most energy efficient triggering mechanisms for luminaires in office space, which may change in a communal area, where lighting typically illuminated the whole space, versus a cell office, where lighting might be spotlighting or provide an island of light. In this case space management analytics may be performed based on analysis which considers energy output of luminaires gathered at particular locations by particular devices. The device from which the data is gathered from and the device location are both important for this type of analytic as the data is based on both location and device specific features. As such it can be seen that it is beneficial to relate the gathered data for energy consumed to location and device ID.

Consider a floor map showing energy consumption of each luminaire on that floor averaged over a chosen time period. In this case, energy data has to be extracted using both the luminaire ID and location. Assume three of the luminaires move in this time period and the energy values shown in the heat map were computed using data corresponding to only the luminaire IDs. It turns out that in the chosen time period, all the luminaires are actually located in the same space (as evidenced by the same energy consumption profile). However, in the map created, three of the luminaires are shown in entirely different positions. This is because they are placed in the map using incorrect current location data. This can happen when the context and/or validity of its location attribute has not been properly incorporated. This is an example where the energy data has to be extracted from luminaire ID and associated properly to a location, with lifetime (validity) management properly applied to both data elements.

An example where data need only be linked to device ID is where the analytics is concerned with diagnostics of the device. For example it may be important to identify which particular device is in fault so that devices requiring fixing may be determined. This may also be important when executing analytics for devices with specific specifications, or for example luminaires with specific functions, e.g. lighting to be used in case of a fire.

To make the data association more complete, context information about the properties of the room or zone attributed to the data values and its validity/lifetime may need to be stored (e.g. in the Cloud or backend database, or at some other storage within the network from where it may be easily retrieved). For example, a room may be a meeting room for the first three weeks of a month, and then a flexible space for the remainder of the month. In another example, the surface (ground) area of a space may change, e.g. when a partition wall between two rooms (either with the same function or with different functions) moves within the envelop of the two rooms such that the surface area of each respective room changes. Any other changes to the environment that may alter the context of sensed data and/or the validity/lifetime of the data and/or the context, can be similarly represented using an indication of a property (e.g. context) and a lifetime associated with the data. For example if a property indicates that a room is a meeting room, then the lifetime of that information is the duration (indicated by start and end dates of this lifetime period) for which this particular piece of contextual property information is correct. There may not be a specific end date entered at the time of retrieving the associated data and using this indication.

Thus it can be that the contextual property associated with the data in the database is used as a tool to further inform the analytics engine about which data should be taken from the database and used in the analysis and the validity/lifetime of the contextual property could be used to inform the analytics engine which data with respects to the available stored time series data to use.

It will be appreciated that the above embodiments have been described only by way of example. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of automatically detecting an alteration in a lighting system comprising a plurality of devices each comprising a luminaire and/or a sensor, wherein each respective one of the devices has a respective location recorded in a commissioning database in association with data reported by the respective device, wherein the data includes a value of a characteristic of the respective device; the method comprising:
performing energy consumption analytics on said data including the respective value of the characteristic of each of the devices;
identifying a subset of said devices located within a predetermined spatial demarcation;
automatically monitoring the respective value of the characteristic of each of the devices in said subset as reported by each of the devices of the subset, thereby forming a data cluster comprising the values of said characteristic for the devices in the subset;
automatically detecting that one of the devices in the subset has been changed by detecting a shift in one of the values relative to the rest of the values in the data cluster; and
in response to said detection, automatically outputting an indication that the commissioning database is likely to require updating to reflect said change.

2. The method of claim 1, where the change includes a movement of the one of the devices in the subset.

3. The method of claim 1, wherein the detecting of said shift comprises evaluating a metric combining the values of the data cluster, and detecting a shift in said metric.

4. The method of claim 3, wherein said metric comprises a centroid of the cluster values.

5. The method of claim 1, wherein said data reported by the respective device comprises a property of a wireless signal received by a wireless node from each of the devices in said subset.

6. The method of claim 5, wherein said property comprises received signal strength and/or time-of-flight and/or angle-of arrival.

7. The method of claim 3, wherein said wireless node is another of the devices located within said spatial demarcation.

8. The method of claim 1, wherein said characteristic comprises a parameter measuring a degree of usage of each device.

9. The method of claim 8, wherein said parameter comprises an energy consumption of the device or wherein each of the devices in the subset comprises a luminaire and said parameter comprises a number of burning hours of the luminaire.

10. The method of claim 1, wherein each of the devices in said subset comprises a sensor and said characteristic comprises a sensor reading sensed by each sensor.

11. The method of claim 10, wherein each of the sensors in said subset comprises a light sensor and the sensor reading comprises a light level reading.

12. The method of claim 10, wherein each of the sensors in said subset comprises a presence sensor and the sensor reading comprises a presence sensing result.

13. The method of claim 1, wherein said characteristic comprises a control setting applied by a user to each device.

14. The method of claim 13, wherein each of the devices in said subset comprises an illumination source and said setting comprises a dim level of each illumination source.

15. Apparatus for automatically detecting an alteration in a lighting system comprising a plurality of devices each comprising a luminaire and/or a sensor, wherein each respective one of the devices has a respective location recorded in a commissioning database in association with data reported by the respective device; the apparatus comprising one or more processing units arranged to retrieve and run code from computer-readable storage comprising one or more memory devices, the code being configured so as when run on the one or more processing units causes the one or more processing units to:
perform energy consumption analytics on said data including the respective value of the characteristic of each of the devices;

for a subset of said devices located within a predetermined spatial demarcation, automatically monitor the respective value of the characteristic of each of the devices in said subset as reported by the each of the devices of the subset, thereby forming a data cluster comprising the values of said characteristic for the devices in the subset;

automatically detect a change in the lighting system by detecting a shift in one of the values relative to the rest of the values in the data cluster; and in response to said detection, automatically output an indication that the commissioning database is likely to require updating to reflect said change.

16. The apparatus of claim 15, wherein the respective value of the characteristic of each of the devices in said subset includes occupancy data, light sensor data or energy consumption data.

17. The apparatus of claim 15, wherein the change includes a movement of one or more of the devices in the subset.

18. The method of claim 1, wherein the respective value of the characteristic of each of the devices in said subset includes occupancy data, light sensor data or energy consumption data.

19. The method of claim 18, wherein the change includes a movement of the one of the devices in the subset.

* * * * *